US012753291B2

(12) United States Patent
Hulteen et al.

(10) Patent No.: US 12,753,291 B2
(45) Date of Patent: Oct. 6, 2026

(54) INTUMESCENT MATERIAL AND ARTICLES MADE THEREOF

(71) Applicant: 3M INNOVATIVE PROPERTIES COMPANY, St. Paul, MN (US)

(72) Inventors: John C. Hulteen, Afton, MN (US); S.M. Ibrahim Al-Rafia, Ontario (CA); Rodrigo Marmol, Maplewood, MN (US); Toheeb B. Alabi, Maplewood, MN (US); Raul Pacheco de Moraes, Ontario (CA); Kent E. Nielsen, Ontario (CA)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 271 days.

(21) Appl. No.: 18/248,269

(22) PCT Filed: Nov. 10, 2021

(86) PCT No.: PCT/IB2021/060405
§ 371 (c)(1),
(2) Date: Apr. 7, 2023

(87) PCT Pub. No.: WO2023/084272
PCT Pub. Date: May 19, 2023

(65) Prior Publication Data

US 2024/0368371 A1 Nov. 7, 2024

Related U.S. Application Data

(60) Provisional application No. 63/107,965, filed on Oct. 30, 2020.

(51) Int. Cl.
*C08K 3/04* (2006.01)
*C08J 5/12* (2006.01)
(Continued)

(52) U.S. Cl.
CPC ................ *C08K 3/04* (2013.01); *C08J 5/124* (2013.01); *C08J 5/18* (2013.01); *H02G 3/081* (2013.01)

(58) Field of Classification Search
CPC .... C08K 3/04; C08J 5/124; C08J 5/18; H02G 3/081; H02G 3/0412
See application file for complete search history.

(56) References Cited

U.S. PATENT DOCUMENTS 5,384,188 A 1/1995 Lebold et al.
6,207,085 B1 3/2001 Ackerman
(Continued)

FOREIGN PATENT DOCUMENTS

DE 4007060 A1 9/1991
EP 0302987 A1 * 2/1989
(Continued)

OTHER PUBLICATIONS

Machine translation of EP-0302987-A1. (Year: 1989).*
(Continued)

*Primary Examiner* — Patricia L. Nordmeyer
(74) *Attorney, Agent, or Firm* — Katherine M. Scholz

(57) ABSTRACT

An intumescent article includes intumescent material including 50-92 wt-% graphite and 8-50 wt-% binder, and may have a free expansion ratio of 100× or greater and a free expansion aspect ratio of 1.0 or less. The intumescent article may be a sheet, and may be L-shaped, rectangle, triangle, or other shape. The intumescent article may have a 3D shape. The intumescent article may be an insert for an electrical box, having a surface area 75% or less of the surface area of the electrical box back wall. The intumescent sheet has a mass, and the ratio of the mass to the volume of the electrical box may be 3 g/100 $cm^3$ or less. A method of making an intumescent article includes mixing from 50-92 wt-% graph-
(Continued)

ite with 8-50 wt-% binder on a dry weight basis to form a mixture, pressing or molding the mixture into a shape and drying the shape.

12 Claims, 3 Drawing Sheets

(51) Int. Cl.
*C08J 5/18* (2006.01)
*H02G 3/08* (2006.01)

(56) References Cited

U.S. PATENT DOCUMENTS

| | | | | |
|---|---|---|---|---|
| 6,252,167 | B1 | 6/2001 | Rose | |
| 6,521,834 | B1 | 2/2003 | Dykhoff et al. | |
| 7,052,314 | B1 | 5/2006 | Rose | |
| 7,348,484 | B1 | 3/2008 | Ackerman | |
| 8,648,256 | B1 | 2/2014 | Rose | |
| 9,258,919 | B1 | 2/2016 | Rose | |
| 2005/0003200 | A1 * | 1/2005 | Norley | B32B 9/00 428/408 |
| 2014/0127443 | A1 * | 5/2014 | Zhou | B32B 25/047 428/355 R |
| 2017/0253691 | A1 | 9/2017 | Shimamoto et al. | |
| 2020/0056073 | A1 * | 2/2020 | Hulteen | E04B 1/948 |

FOREIGN PATENT DOCUMENTS

| | | | | | |
|---|---|---|---|---|---|
| EP | 1221749 | B1 | | 7/2010 | |
| EP | 3280018 | B1 | | 5/2020 | |
| IT | 1030482 | B | * | 3/1979 | C08K 3/04 |
| JP | 2002501970 | A | * | 1/2002 | C09K 21/14 |
| WO | WO-9411462 | A1 | * | 5/1994 | C08K 3/04 |
| WO | WO-9938933 | A1 | * | 8/1999 | C09K 21/14 |
| WO | WO-0219472 | A1 | * | 3/2002 | C09K 21/00 |

OTHER PUBLICATIONS

Machine translation of IT-1030482-B (Year: 1979).*
Machine translation of JP-2002501970-A (Year: 2002).*
Asbury Carbons, "Expandable Flake Graphite", Retrieved on Oct. 30, 2020, URL : <https://asbury.com/resources/education/science-of-graphite/expandable-flake-graphite/>, 16 pages.
Hagiwara, "Reactions of Graphite Hexafluoroarsenates with Fluorobases in Anhydrous Hydrogen Fluoride", 1998, Journal of Fluorine Chemistry, vol. 88, pp. 201-206.
Horacek, "Gaskets with Expandable Graphite Treated with Nitric, Sulphuric, Phosphoric Acids and Ferric Chloride", Apr. 25, 2015, Open Access Library Journal, 2:e1297, 21 pages.
International Search Report received for PCT International Application No. PCT/IB2021/060405, mailed on Jul. 18, 2022, 4 pages.
Intertek, "UL 263: Fire Tests of Building Construction and Materials", (Date unknown but believed to be prior to the date of the filing of the present application), URL: <https://www.intertek.com/building/standards/ul-263/>, 3 pages.
Liu, "Electrochemical Preparation of Sulphur-Free and Low-Temperature Expandable Graphite with Large Exfoliated Volume," Oct. 1, 2014, Journal of South China University of Technology (Natural Science), vol. 42, No. 10, pp. 50-56. (Abstract page included).
UL Standard for Safety, "UL 1479 Standard for Fire Tests of Penetration Firestops", Jun. 10, 2015, 4th Edition, 36 pages.
Wikipedia, "Graphite Intercalation Compound", Retrieved on Oct. 30, 220, URL:<https://en.wikipedia.org/wiki/Graphite_intercalation_compound>, 6 pages.
Zhai, "Preparation and Characteristics of Expandable Graphite with Sodium Tripolyphosphate Assistant Intercalation", 2015, Asian Journal of Chemistry, vol. 27 No. 8, pp. 2971-2975.

* cited by examiner

INTUMESCENT MATERIAL AND ARTICLES MADE THEREOF

FIELD

The present disclosure relates to intumescent materials and to sheets and articles made thereof. The present disclosure further relates to intumescent materials for use in enclosures, such as electrical boxes.

BACKGROUND

An important part of modern building design is the protection of structures from the damaging effects of fire and impeding the spread of fire within the structures. A variety of fire protection systems, including mineral insulants, cementitious sprays, intumescent coatings, free-standing intumescent sheets, and the like, have been developed. An intumescent material expands when exposed to heat and can be used to insulate materials and structures from heat and to slow down the spread of fire by blocking openings through which fire could spread. Some intumescent materials produce a light char as a result of heating of the components of the intumescent material, such as carbon-containing binders. Some intumescent materials, such as those containing sodium silicate or graphite, may produce a hard char. Intumescent materials may further include flame retardant agents or compounds, such as hydrates, that have a cooling effect upon heating and decomposing.

Openings in walls and other structures may be covered by an intumescent material sheet that is intended to block or seal the opening in the event of fire. Specific intumescent products have been developed for use on the inside of electrical boxes, which include through holes for electrical wires. Such products are intended to maintain the hourly ratings of fire resistive walls and partitions containing flush mounted devices such as outlet boxes, electrical cabinets, or mechanical cabinets. The specific applications and the method of installation for which the materials have been evaluated are provided in individual classifications for each product. The standard used to investigate products in this category is ANSI/UL 263, "Fire Tests of Building Construction and Materials." Another standard that may be used is UL Standard for Safety for Fire Tests of Penetration Firestops, UL 1479 (Fourth Edition, 2015).

In order to achieve the desired fire retardation and hourly rating, existing intumescent electrical box inserts typically are applied to cover the entire back wall of the electrical box so that when the firestop insert intumesces (expands with heat), the entire box is filled with the expanded material and fire cannot go through the box. The insert covers the entire back wall because existing materials typically exhibit the largest amount of expansion in only one dimension and/or only exhibit limited amount of expansion, thus requiring a large amount of the intumescent material in order to fill the box in the event of a fire. However, covering the entire back wall of the box creates difficulties in performing electrical work within the box, such as fitting cables and switches. In addition, because the existing intumescent materials available for electrical boxes take up a lot of space within the electrical box, they are very difficult to retrofit into an existing wired electrical box.

Further improvements to intumescent materials for fireproofing are desired.

SUMMARY

An intumescent article includes intumescent material. The intumescent material includes from 50 wt-% to 92 wt-% graphite and from 8 wt-% to 50 wt-% binder. The intumescent article may be a sheet. The intumescent article may have a three-dimensional shape, having a major surface extending in three dimensions. The intumescent material may include from 55 wt-% to 90 wt-%, from 60 wt-% to 90 wt-%, from 70 wt-% to 90 wt-%, or about 80 wt-% graphite. The intumescent material may include from 10 wt-% to 45 wt-%, from 10 wt-% to 40 wt-%, from 10 wt-% to 30 wt-%, or about 20 wt-% binder. The intumescent material has a free expansion ratio of 100× or greater. The intumescent material has a free expansion aspect ratio of 1.0 or less.

According to an embodiment, an intumescent article for an electrical box having a back wall with a surface area surrounded by side walls defining a volume includes an intumescent sheet having a shape defining a surface area. In this context, surface area is understood to mean the surface area of one major surface of the sheet (e.g., the surface of one major side of the sheet), which for a planar sheet is equivalent to an area covered by the sheet when placed flat on a surface. The intumescent sheet includes intumescent material. The intumescent material may include from 50 wt-% to 92 wt-% graphite; and from 8 wt-% to 50 wt-% binder. The surface area of the intumescent sheet may be smaller than the surface area of the electrical box back wall. The intumescent sheet has a mass, and the ratio of the mass to the volume of the electrical box may be 3 g/100 $cm^3$ or less, 2.5 g/100 $cm^3$ or less, 2.0 g/100 $cm^3$ or less, 1.5 g/100 $cm^3$ or less, or 1.2 g/100 $cm^3$ or less. The surface area of the intumescent sheet may be 75% or less, 60% or less, 50% or less, 40% or less, 30% or less, or 25% or less of the surface area of the electrical box back wall. The intumescent material forms a layer that may have a thickness of 0.5 mm to 10 mm, or from 1 mm to 6 mm. Upon heating to 350° C. or greater, the intumescent material is capable of expanding to fill 90% or more, 95% or more, 98% or more, or 100% of the volume of the electrical box.

According to an embodiment, a method of applying an intumescent sheet to an enclosure having a back wall surrounded by side walls includes applying the intumescent sheet onto at least one of the walls of the enclosure, covering less than 75% of a surface area of the back wall with the intumescent sheet. The intumescent sheet may include a layer of intumescent material that includes from 50 wt-% to 92 wt-% graphite, and from 8 wt-% to 50 wt-% binder. The enclosure may be disposed within a fire wall. The enclosure may include an electrical box, a fire extinguisher box, or an elevator call box. The intumescent sheet may have a surface area 60% or less, 50% or less, 40% or less, 30% or less, or 25% or less of the surface area of the enclosure back wall. The method may include applying a plurality of discontinuous intumescent sheets onto at least one of the walls, the plurality of intumescent sheets having a total surface area that is 75% or less, 60% or less, 50% or less, 40% or less, 30% or less, 25% or less, or 20% or less of the surface area of the back wall.

According to an embodiment, a method of making an intumescent article includes mixing from 50 wt-% to 92 wt-% graphite with 8 wt-% to 50 wt-% binder on a dry weight basis to form a mixture. The method also includes pressing or molding the mixture into a shape and drying the shape. The mixture may further include a solvent. The mixture may have a solids content of 40 wt-% to 80 wt-%, from 50 wt-% to 70 wt-%, or from 55 wt-% to 65 wt-%. The shape may be a sheet. The shape may be a three-dimensional shape having a major surface extending in three dimensions.

DEFINITIONS

Figure 1A:
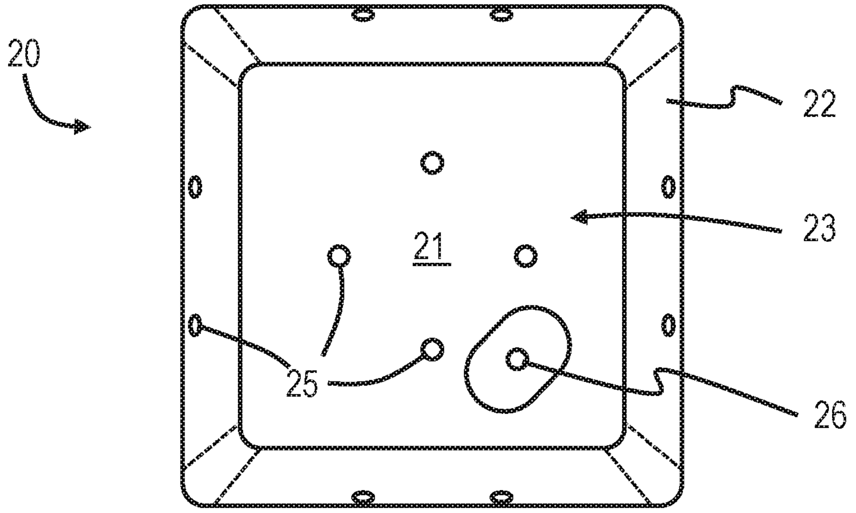
FIGS. 1A and 1B are schematic top perspective views of typical electrical box designs.

All scientific and technical terms used herein have meanings commonly used in the art unless otherwise specified. The definitions provided herein are to facilitate understanding of certain terms used frequently herein and are not meant to limit the scope of the present disclosure.

The term “free expansion ratio” is used here to refer to the amount of increase in the volume of a material upon heating to 350° C. as compared to the initial volume of the material before heating, when the material is not restricted within a space (i.e., is free to expand in multiple directions). For example, a free expansion ratio of 10× means that the final volume after the material is heated to 350° C. is 10 times the initial volume of the material.

The term “constrained expansion ratio” is used here to refer to the amount of increase in the volume of material upon heating to 350° C. as compared to the initial volume of the material before heating, when constrained in two lateral dimensions while being free to expand in thickness (e.g., height).

The term “free expansion aspect ratio” is used here to refer to the ratio of expansion in height versus radius (e.g., width), upon heating to 350° C., when the material is not restricted within a space (i.e., is free to expand in multiple directions). A free expansion aspect ratio of 1.0 indicates that the material expands equally in height and radius. For materials with greater expansion in one lateral direction than another, the average lateral expansion may be used for the radius in calculating the free expansion aspect ratio.

Unless otherwise indicated, the terms “polymer” and “polymeric material” include, but are not limited to, organic homopolymers, copolymers, such as for example, block, graft, random and alternating copolymers, terpolymers, etc., and blends and modifications thereof. Furthermore, unless otherwise specifically limited, the term “polymer” shall include all possible geometrical configurations of the material. These configurations include, but are not limited to, isotactic, syndiotactic, and atactic symmetries.

The term “substantially” as used here has the same meaning as “significantly,” and can be understood to modify the term that follows by at least about 90%, at least about 95%, or at least about 98%.

The term “not substantially” as used here has the same meaning as “not significantly,” and can be understood to have the inverse meaning of “substantially,” i.e., modifying the term that follows by not more than 25%, not more than 10%, not more than 5%, or not more than 2%.

The term “about” is used here in conjunction with numeric values to include normal variations in measurements as expected by persons skilled in the art, and is understood to have the same meaning as “approximately” and to cover a typical margin of error, such as ±5% of the stated value.

Terms such as “a,” “an,” and “the” are not intended to refer to only a singular entity, but include the general class of which a specific example may be used for illustration.

The terms “a,” “an,” and “the” are used interchangeably with the term “at least one.” The phrases “at least one of” and “comprises at least one of” followed by a list refers to any one of the items in the list and any combination of two or more items in the list.

As used here, the term “or” is generally employed in its usual sense including “and/or” unless the content clearly dictates otherwise. The term “and/or” means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is “up to” or “at least” a particular value, that value is included within the range.

As used here, “have”, “having”, “include”, “including”, “comprise”, “comprising” or the like are used in their open-ended sense, and generally mean “including, but not limited to.” It will be understood that “consisting essentially of,” “consisting of,” and the like are subsumed in “comprising” and the like. As used herein, “consisting essentially of,” as it relates to a composition, product, method or the like, means that the components of the composition, product, method or the like are limited to the enumerated components and any other components that do not materially affect the basic and novel characteristic(s) of the composition, product, method or the like.

The words “preferred” and “preferably” refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to here, such as “top,” “bottom,” “left,” “right,” “upper,” “lower,” and other directions and orientations are described herein for clarity in reference to the figures and are not to be limiting of an actual device or system or use of the device or system. Devices or systems as described herein may be used in a number of directions and orientations.

DETAILED DESCRIPTION

The present disclosure relates to intumescent materials and to sheets and articles made thereof. The present disclosure further relates to intumescent materials for use in enclosures, such as enclosures in or on fire walls or other fire safe structures. Examples of such enclosures include electrical boxes, fire extinguisher boxes, elevator call boxes, and the like.

Figure 1B:
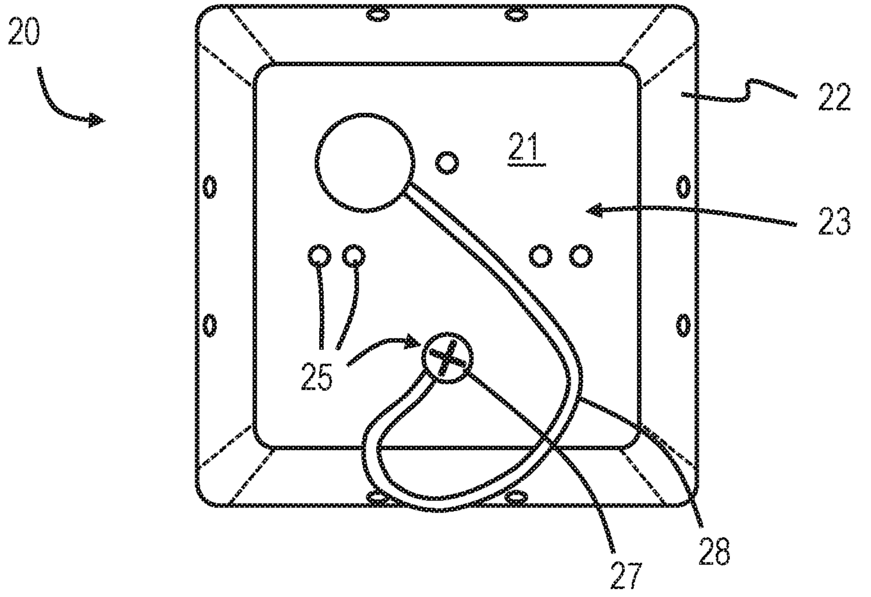
Figure 2:
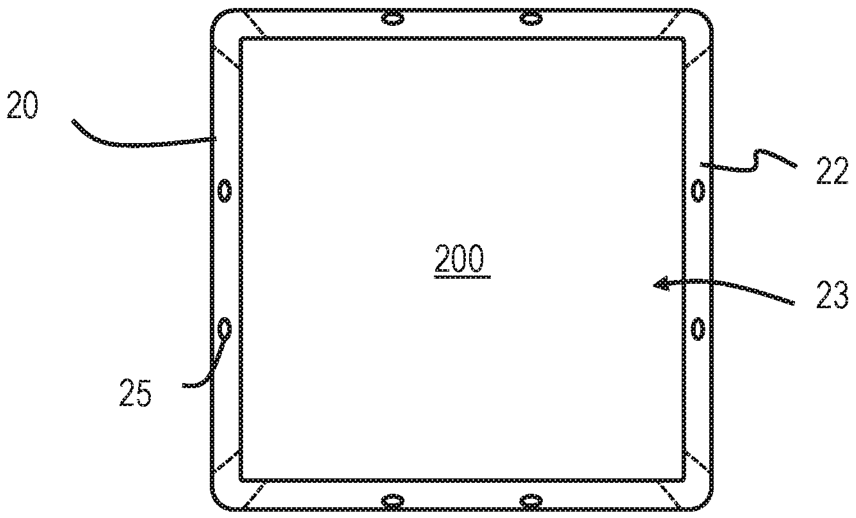
FIG. 2 is a schematic depiction of an electrical box with a prior art intumescent sheet insert.

Existing intumescent material sheets or inserts for electrical boxes are typically sized so that they cover the entire back wall of the electrical box. Schematics of exemplary electrical boxes are shown in FIGS. 1A and 1B, and an example of a typical intumescent insert in an electrical box is shown in FIG. 2. A typical electrical box 20 includes a back wall 21 surrounded by a side wall 22, defining an interior volume 23. An electrical box 20 also typically includes various holes 25 and openings to accommodate installation and mounting, as well as routing of electrical wires. In some cases, the electrical box 20 may include a raised grounding screw location 26, as shown in FIG. 1A. In other cases, one of the other holes 25 may be used to install a grounding screw 27 and a ground wire 28, as shown in FIG. 1B. As can be seen in FIG. 2, a typical intumescent insert 200 covers all of the holes in the back wall of the electrical box 20, making it more difficult to access the holes and/or to install the electrical box.

According to an embodiment, the intumescent material of the present disclosure has a high expansion ratio in all three dimensions. Thus, the intumescent material can be used in a relatively small amount while being able to fill a relatively large volume inside an enclosure upon heating. For example, when used in an electrical box, the intumescent material may be added as a small piece (or a plurality of pieces) inside the electrical box and will be sufficient to fill the electrical box when heated. An electrical box typically includes multiple holes for electrical wires and for screwing in grounding screws. The intumescent material of the present disclosure may be applied in a way that the holes are accessible and not covered by the intumescent sheet.

The intumescent material of the present disclosure may be formed as an intumescent sheet. The sheet may be cut into various shapes and sizes to accommodate different enclosures. The sheet may include a skin that may support the intumescent material and may help with handling of the sheet. The intumescent material may also be formed into other, for example three-dimensional ("3D"), shapes. By 3D shape, it is meant that the intumescent article has a first major surface and an opposing second major surface, where at least the first major surface extends in three dimensions. For example, the intumescent material may be formed into curved 3D shapes, such as a concave shape (e.g., a cup), a tube, or a shape that includes both flat and curved portions.

According to an embodiment, the intumescent material is provided as an intumescent sheet or 3D shape. The intumescent sheet or shape may include a layer of intumescent material and optionally a skin or other layers adhered to the layer of intumescent material. The intumescent material may include from 50 wt-% to 92 wt-% graphite and from 8 wt-% to 50 wt-% binder. For example, the intumescent material may include 55 wt-% or more, 60 wt-% or more, or 70 wt-% or more of graphite. The amount of graphite in the intumescent material may be 90 wt-% or less or 85 wt-% or less. In one embodiment, the intumescent material includes about 80 wt-% of graphite. The intumescent material may include 10 wt-% or more, 12 wt-% or more, 15 wt-% or more, or 18 wt-% or more of binder. The intumescent material may include 45 wt-% or less, 40 wt-% or less, 35 wt-% or less, 30 wt-% or less, or 25 wt-% or less of binder. For example, the amount of binder may be about 20 wt-%. In some embodiments, the intumescent material consists of graphite and binder. The intumescent material may be free of chemical flame retardant agents, such as aluminum hydroxide (ATH); magnesium hydroxide (MDH); huntite; hydromagnesite; red phosphorus; boron compounds such as borates; organohalogen compounds; acid derivative and chlorinated paraffins; organobromines such as decabromodiphenyl ether (decaBDE) and decabromodiphenyl ethane; polymeric brominated compounds such as brominated polystyrenes; brominated carbonate oligomers (BCOs); brominated epoxy oligomers (BEOs); tetrabromophthalic anyhydride; tetrabromobisphenol; tetrabromobisphenol A (TBBPA); hexabromocyclododecane (HBCD); melamine phosphate; and melamine polyphosphate.

Any graphite with a suitably high expansion capacity may be used. Suitable graphites include intercalated expandable flake graphites, such as bisulfite, sulfuric acid, phosphoric acid, nitric acid, ferric chloride, or perchlorate intercalated graphite. For example, the graphite may be selected from materials commercially available under the following trade names: ASBURY Grade 3772, ASBURY Grade 1721, ASBURY Grade 3721, ASBURY Grade 1722, ASBURY Grade 3335, ASBURY Grade 3577, ASBURY Grade 3570, ASBURY Grade 1395, ASBURY Grade 3558, ASBURY Grade 3626, ASBURY Grade 3494, ASBURY Grade 3538, NYAGRAPH 35, NYAGRAPH 200, NYAGRAPH 351, NYAGRAPH 251, NYAGRAPH KP 251, NYAGRAPH 249, NYAGRAPH 250, GRAFGUARD Grade 160-50N, GRAFGUARD Grade 160-80N, GRAFGUARD Grade 180-60N, GRAFGUARD Grade 200-100N, GRAFGUARD Grade 210-200N, GRAFGUARD Grade 220-50N, GRAFGUARD Grade 220-80N, GRAFGUARD Grade 250-50N, GRAFGUARD Grade 280-50N, or a combination thereof. In one embodiment, the graphite includes ASBURY Grade 3772, ASBURY Grade 1721, NYAGRAPH 351, or a combination thereof.

Any binder that is compatible with use in an intumescent material and does not interfere with the intumescent properties may be used. For example, the binder may include polyvinyl acetate (PVA), vinyl acetate acrylics, vinyl acrylics, acrylics polymers, elastomers and copolymers, polychloroprene, polyurethane dispersions, polyvinyl alcohol (PVOH), vinyl acetate polymers (PVA) and copolymers (PVAC), ethylene vinyl acetate (EVA), natural rubber latex, and synthetic elastomers such as styrene-butadiene rubber (SBR) or polyurethane (PUR) and modified styrene-butadiene rubber (SBR), polyvinyl chloride (PVC), polymers and copolymers produced from the monomers vinyl acetate, ethylene, and acrylate; polymers and copolymers produced from the monomers vinyl acetate and ethylene; polymers and copolymers produced from the monomers ethylene and acrylate; or a combination thereof. Preferably, the binder includes polymers and copolymers produced from the monomers: vinyl acetate, ethylene, and acrylate; from vinyl acetate and ethylene; or from ethylene and acrylate; or a combination thereof. In one embodiment, the binder is a polymer or copolymer produced from the monomers vinyl acetate, ethylene, and acrylate.

According to an embodiment, the intumescent material has a free expansion ratio of 80× or greater, 90× or greater, 100× or greater, 110× or greater, or 120× or greater. There is no desired upper limit for the free expansion ratio but in practice, the free expansion ratio may by up to 400×, or up to 350×. The intumescent material may have a free expansion aspect ratio of 1.0 or less, 0.95 or less, or 0.8 or less. According to an embodiment, the intumescent material has a constrained expansion ratio of 70× or greater, 80× or greater, 90× or greater, 100× or greater, or 110× or greater.

According to an embodiment, the intumescent sheet includes a layer of intumescent material and one or more other layers adhered to the layer of intumescent material. For example, the intumescent sheet may include a skin adhered to the intumescent material by an adhesive. The skin may be a liner made of polymeric film, such as a polypropylene, polyethylene, PVC, or polystyrene film, or paper, metal foil, a non-woven matrix, a woven matrix, a foam, or the like, or any combination thereof. The skin may provide support to the intumescent material, allowing it to be more easily handled (e.g., cut and bent) without breakage. The skin may provide a surface for insignia, such as brand name and product information. The skin may include one or two layers of adhesive. The adhesive may be disposed between the intumescent material and the liner, on an outside surface of the liner, or both. In cases where an adhesive is disposed on the outside surface of the polymeric liner, the skin may further include a removable release liner. Any suitable adhesive may be used, such as a pressure sensitive adhesive (PSA).

Examples of suitable PSAs for use in the skin include adhesives made from natural rubbers, synthetic rubbers, styrene block copolymers, polyvinyl ethers, acrylics, poly-α-olefins, silicones, polyurethanes or polyureas, and combinations thereof. Useful natural rubber pressure sensitive adhesives generally contain masticated natural rubber, one or more tackifying resins, and typically one or more antioxidants. Synthetic rubber adhesives are generally rubbery elastomers, which are either self-tacky or non-tacky and require tackifiers. Self-tacky synthetic rubber pressure sensitive adhesives include, for example, butyl rubber, a copolymer of isobutylene with less than 3 percent isoprene, polyisobutylene, a homopolymer of isoprene, polybutadiene, and styrene/butadiene rubber. Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Acrylic pressure sensitive adhesives generally have a glass transition temperature of about −20° C. or less and may include a $C_3$-$C_{12}$ alkyl ester component and a polar component such as, for example, acrylic acid, methacrylic acid, ethylene-vinyl acetate units, N-vinylpyrrolidone, and styrene macromer. Poly-α-olefin pressure sensitive adhesives generally comprise either a substantially uncrosslinked polymer or an uncrosslinked polymer that may have radiation activatable functional groups grafted thereon. The poly-α-olefin polymer may be self-tacky and/or include one or more tackifying materials. Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea or oxamide terminated hard segments. The tackifying resin is generally a three-dimensional silicate structure that is end-capped with trimethylsiloxy groups (OSiMe3) and also contains some residual silanol functionality.

According to an embodiment, the intumescent material may be made by mixing the graphite and the binder with a solvent to form a mixture, and pressing or molding the mixture into a shape, such as a sheet or a 3D shape. The material may be shaped during manufacturing (before drying) and may optionally be further shaped afterwards either thermally or mechanically. The shaped mixture (e.g., sheet or 3D shape) may be dried. The mixture may include from 50 wt-% to 92 wt-% graphite with 8 wt-% to 50 wt-% binder on a dry weight basis. For example, the mixture may include 55 wt-% or more, 60 wt-% or more, or 70 wt-% or more of graphite on a dry weight basis. The amount of graphite in the mixture may be 90 wt-% or less or 85 wt-% or less on a dry weight basis. For example, the amount of graphite in the mixture may be from 60 wt-% to 90 wt-% or from 70 wt-% to 85 wt-%. In one embodiment, the mixture includes about 80 wt-% of graphite on a dry weight basis. The mixture may include 10 wt-% or more, 12 wt-% or more, 15 wt-% or more, or 18 wt-% or more of binder on a dry weight basis. The mixture may include 45 wt-% or less, 40 wt-% or less, 35 wt-% or less, 30 wt-% or less, or 25 wt-% or less of binder on a dry weight basis. For example, the amount of binder in the mixture may be from 10 wt-% to 40 wt-% or from 15 wt-% to 30 wt-%. In one embodiment, the amount of binder is about 20 wt-% on a dry weight basis.

In some embodiments, mixing the graphite and binder with the solvent forms a dispersion or an emulsion. The mixture (e.g., dispersion or emulsion) may have a solids content of 40 wt-% or greater, 50 wt-% or greater, or 55 wt-% or greater. The mixture may have a solids content of 65 wt-% or less, 70 wt-% or less, or 80 wt-% or less. For example, the mixture may have a solids content of 40 wt-% to 80 wt-%, from 50 wt-% to 70 wt-%, or from 55 wt-% to 65 wt-%. Any suitable solvent may be used. For example, the mixture may be made with an aqueous solvent or an organic solvent. In a preferred embodiment, the solvent is water.

The intumescent material may be formed into a layer having any suitable thickness. In many applications, a thickness of 0.5 mm to 10 mm may be used. The thickness of the intumescent material layer may be 0.5 mm or greater, 1 mm or greater, 2 mm or greater, 3 mm or greater, or 4 mm or greater. The thickness of the intumescent material layer may be 6 mm or less, 8 mm or less, 10 mm or less, or 12 mm or less, although even greater thicknesses may be used. In some cases, the thickness may range from 0.5 mm to 10 mm, from 1 mm to 8 mm, or from 2 mm to 6 mm.

The intumescent material may be formed into any suitable shape and size depending on the desired use. In some embodiments, the intumescent material is formed into an intumescent sheet for use in an enclosure, such as an enclosure on or embedded in a fire wall. For example, the intumescent material may be formed into an intumescent article for use in an electrical box, a fire extinguisher box, or an elevator call box. According to an embodiment, the enclosure (e.g., an electrical box, a fire extinguisher box, or an elevator call box) has a back wall with a surface area surrounded by side walls defining a volume, and the surface area of the intumescent sheet is smaller than the surface area of the electrical box back wall. For example, the surface area of the intumescent sheet may be 75% or less, 60% or less, 50% or less, 40% or less, 30% or less, or 25% or less of the surface area of the enclosure back wall. The intumescent article is sized such that when the intumescent material (or intumescent sheet or article) is heated to 350° C. or greater, the intumescent material is capable of expanding to fill 90% or more, 95% or more, 98% or more, or 100% of the volume of the enclosure (e.g., an electrical box, a fire extinguisher box, or an elevator call box).

The amount of intumescent material provided in the enclosure may be determined as the mass of intumescent material (or intumescent sheet or article) relative to the volume of the enclosure. It may be assumed that most of the mass of the intumescent sheet or article is made up by the intumescent material, and that the mass of the skin and adhesive are negligible in this context. According to an embodiment, the ratio of the mass of the intumescent material (or intumescent sheet or article) to the interior volume of the electrical box is 3 g/100 $cm^3$ or less, 2.5 g/100 $cm^3$ or less, 2.0 g/100 $cm^3$ or less, 1.5 g/100 $cm^3$ or less, or 1.2 g/100 $cm^3$ or less. While there is no desired lower limit for the ratio (assuming that the amount of intumescent material is enough to fill the enclosure upon heating), in practice the ratio may be 0.8 g/100 $cm^3$ or greater.

In some cases, the enclosure may be an electrical box. Electrical boxes are commonly available in multiple sizes, such as 4 inches by 4 inches (having a back wall surface area of 16 square inches) (about 10 cm×10 cm, area about 100 $cm^2$), 5 inches by 5 inches (having a back wall surface area of 25 square inches) (about 12.5 cm×12.5 cm, area 161 $cm^2$), etc. In an exemplary embodiment, an intumescent article for a 4-inch by 4-inch (about 10 cm by 10 cm) electrical box is an intumescent sheet having a thickness of 4 mm to 6 mm and a surface area of 2 square inches (about 13 $cm^2$) to 8 square inches (about 52 $cm^2$), or from 2 square inches (about 13 $cm^2$) to 6 square inches (about 39 $cm^2$). The size of the intumescent article may be determined based on the size of the electrical box. In some cases, the surface area of the intumescent sheet may be 80 $cm^2$ or less, 60 $cm^2$ or less, 50 $cm^2$ or less, 40 $cm^2$ or less, 30 $cm^2$ or less, 25 $cm^2$ or less, 20 $cm^2$ or less, or 15 $cm^2$ or less. The intumescent sheet (e.g., intumescent article) may have a mass of 12 g or less, 10 g or less, 8 g or less, or 6 g or less.

The intumescent article may be shaped to accommodate the enclosure the article is intended to be used in. For example, the intumescent article may be a sheet shaped as a rectangle, a square, a triangle, a circle, an oval, or any other regular, irregular, polygonal, or rounded shape. In some embodiments the intumescent article is L-shaped. By "L-shaped" it is meant that the article is a sheet shaped like a rectangle with one corner removed (e.g., having a rectangle cut off), substantially in the shape of the letter L. In some embodiments, the intumescent article has a 3D shape. That is, the intumescent article has a first major surface and an opposing second major surface, where at least the first major surface extends in three dimensions. For example, the intumescent article may form a dome or cup shape, be shaped like a tube, or include planar and 3D portions. Such 3D shaped intumescent articles may be fitted into enclosures or openings in a wall, or around shapes such as pipes or conduits.

Figure 3A:
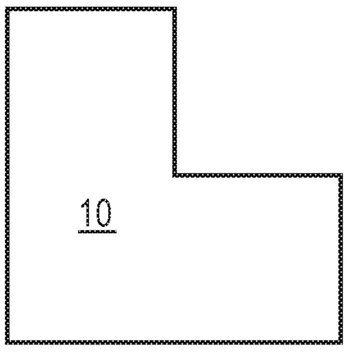
FIG. 3A is a schematic top view of an intumescent article for an electrical box according to an embodiment.
Figure 3B:
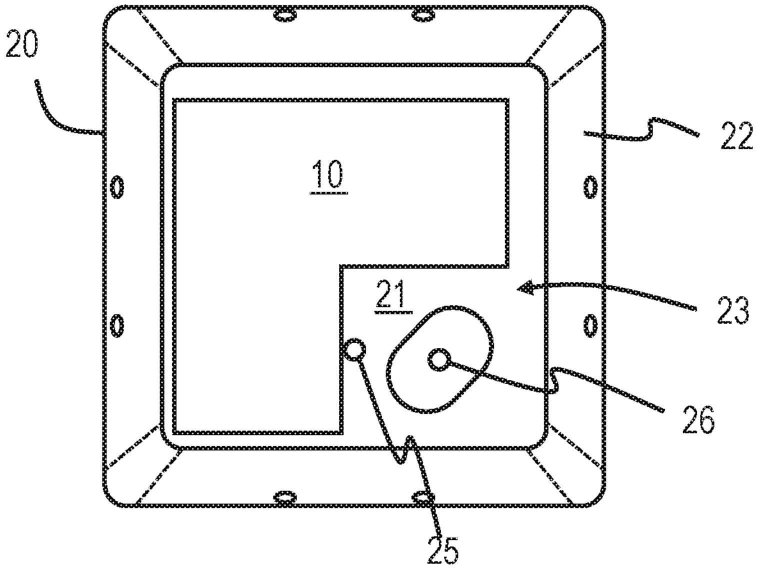
FIG. 3B is a schematic top perspective view of an electrical box with the intumescent article of FIG. 3A according to an embodiment.

An example of an intumescent article 10 cut into an L-shape is shown in FIGS. 3A and 3B. The intumescent article 10 may be applied to (e.g., inserted into) the electrical box while leaving at least some of the holes 25 for electrical conduits and screws exposed, including the raised grounding screw location 26.

Figure 4A:
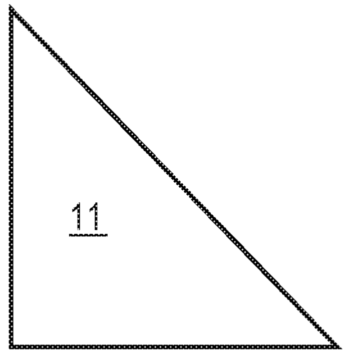
FIG. 4A is a schematic top view of an intumescent article for an electrical box according to an embodiment.
Figure 4B:
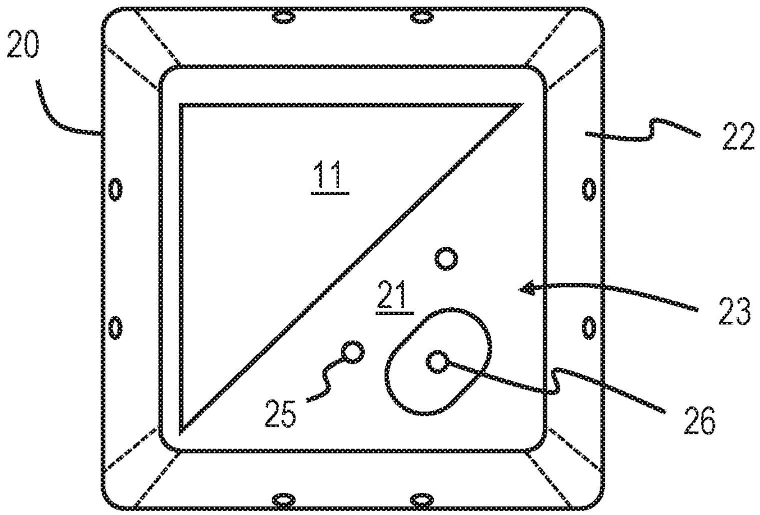
FIG. 4B is a schematic top perspective view of an electrical box with the intumescent article of FIG. 4A according to an embodiment.

An example of an intumescent article 11 cut into a triangle shape is shown in FIGS. 4A and 4B. The intumescent article 11 may be applied to (e.g., inserted into) the electrical box while leaving at least some of the holes 25 for electrical conduits and screws exposed, including the raised grounding screw location 26.

Figure 5A:
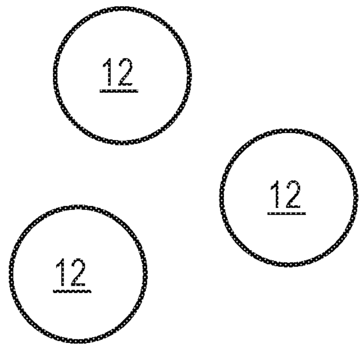
FIG. 5A is a schematic top view of a plurality of intumescent articles for an electrical box according to an embodiment.
Figure 5B:
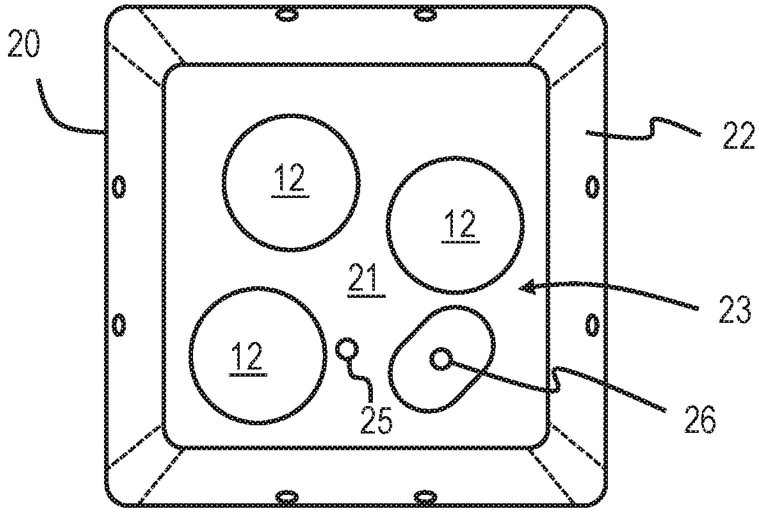
FIG. 5B is a schematic top perspective view of an electrical box with the plurality of intumescent articles of FIG. 5A according to an embodiment.

An example of an intumescent article 12 cut into a plurality of pieces is shown in FIGS. 5A and 5B. While a round shape is shown, any other shape could also be used, such as a rectangle. The plurality of pieces of intumescent article 12 may be applied to (e.g., inserted into) the electrical box while leaving at least some of the holes 25 for electrical conduits and screws exposed, including the raised grounding screw location 26.

According to an embodiment, the intumescent material (e.g., intumescent sheet or article) is applied to an enclosure by disposing one or more pieces of intumescent material inside the enclosure. For example, the application may include simply placing one or more pieces of intumescent material inside the enclosure without adhering the intumescent material to the enclosure. In some embodiments, the application includes adhering the intumescent material to a surface of the enclosure, such as to the back wall, to a side wall, or to both the back wall and the side wall. The term "side wall" is used here to refer to both the sides but also the top and bottom (e.g., floor) of the enclosure. The intumescent sheet may be applied by peeling off a release liner and pressing the adhesive onto a surface of the enclosure. The intumescent sheet may be selected and applied such that the sheet covers less than 75% of a surface area of the back wall of the enclosure. For example, the intumescent sheet may cover 60% or less, 50% or less, 40% or less, 30% or less, or 25% or less of the surface area of the enclosure back wall. The enclosure may be disposed within a fire wall. The enclosure may include an electrical box, a fire extinguisher box, an elevator call box, or the like.

In some embodiments, the intumescent sheet is provided as a plurality of discontinuous sections or pieces of intumescent sheet, and the application includes applying (e.g., disposing, adhering, or placing) the plurality of discontinuous sections or pieces inside the enclosure. For example, the application may include placing the plurality of discontinuous sections or pieces inside the enclosure or adhering the plurality of discontinuous sections or pieces onto at least one of the walls of the enclosure. The plurality of discontinuous sections or pieces of intumescent sheet may have a total surface area that is 75% or less, 60% or less, 50% or less, 40% or less, 30% or less, 25% or less, or 20% or less of the surface area of the back wall of the enclosure.

According to an embodiment, the intumescent material (e.g., intumescent sheet or article) applied to the enclosure, whether applied as one piece or a plurality of pieces, has a mass and the enclosure has an interior volume, and the ratio of the mass to the interior volume is 3 g/100 $cm^3$ or less, 2.5 g/100 $cm^3$ or less, 2.0 g/100 $cm^3$ or less, 1.5 g/100 $cm^3$ or less, or 1.2 g/100 $cm^3$ or less. According to an embodiment, the amount of intumescent material is selected such that upon heating to 350° C. or greater, the intumescent material is capable of expanding to fill 90% or more, 95% or more, 98% or more, or 100% of an interior volume of the enclosure.

According to an embodiment, the enclosure is an electrical box, and applying the intumescent material (e.g., intumescent sheet or article) involves leaving the holes of the electrical box for electrical conduits and screws exposed. In other words, the intumescent sheet is applied such that it does not cover the holes for electrical conduits and screws. Similar accommodations for various openings and holes may be made in enclosures other than electrical boxes.

EMBODIMENTS

The following is a list of exemplary embodiments according to the present disclosure:

According to an embodiment, an intumescent article comprises intumescent material, the intumescent material comprising from 50 wt-% to 92 wt-% graphite; and from 8 wt-% to 50 wt-% binder.

Embodiment 2 is the intumescent article of embodiment 1, wherein the article is a sheet.

Embodiment 3 is the intumescent article of embodiment 1, wherein the article has a three-dimensional shape that comprises a major surface extending in three dimensions.

The article may be shaped like a concave shape (e.g., a cup), a tube, or a shape that includes both flat and curved portions.

Embodiment 4 is the intumescent article of any one of embodiments 1 to 3, wherein the intumescent material comprises 50 wt-% or more, 55 wt-% or more, 60 wt-% or more, or 70 wt-% or more of graphite; and/or 90 wt-% or less or 85 wt-% or less of graphite. The intumescent material may include from 55 wt-% to 90 wt-%, from 60 wt-% to 90 wt-%, from 70 wt-% to 90 wt-%, or about 80 wt-% graphite.

Embodiment 5 is the intumescent article of any one of embodiments 1 to 4, wherein the intumescent material comprises 10 wt-% or more, 12 wt-% or more, 15 wt-% or more, or 18 wt-% or more of binder; and/or 45 wt-% or less, 40 wt-% or less, 35 wt-% or less, 30 wt-% or less, or 25 wt-% or less of binder. The intumescent material may include from 10 wt-% to 45 wt-%, from 10 wt-% to 40 wt-%, from 10 wt-% to 30 wt-%, or about 20 wt-% binder.

Embodiment 6 is the intumescent article of any one of embodiments 1 to 5, wherein the intumescent material has a free expansion ratio of 80× or greater, 90× or greater, 100× or greater, 110× or greater, or 120× or greater. The free expansion ratio may be up to 400×, or up to 350×.

Embodiment 7 is the intumescent article of any one of embodiments 1 to 6, wherein the intumescent material has a free expansion aspect ratio of 1.0 or less, 0.95 or less, or 0.8 or less.

Embodiment 8 is the intumescent article of any one of embodiments 1 to 7, wherein the intumescent material has a constrained expansion ratio of 70× or greater, 80 or greater, 90× or greater, 100× or greater, or 110× or greater.

Embodiment 9 is the intumescent article of any one of embodiments 1 to 8, wherein the graphite comprises bisulfite intercalated graphite, sulfuric acid intercalated graphite, or phosphoric acid intercalated graphite, preferably bisulfite intercalated graphite. The graphite may be selected from materials commercially available under the following trade names: ASBURY Grade 3772, ASBURY Grade 1721, ASBURY Grade 3721, ASBURY Grade 1722, ASBURY Grade 3335, ASBURY Grade 3577, ASBURY Grade 3570, ASBURY Grade 1395, ASBURY Grade 3558, ASBURY Grade 3626, ASBURY Grade 3494, ASBURY Grade 3538, NYAGRAPH 35, NYAGRAPH 200, NYAGRAPH 351, NYAGRAPH 251, NYAGRAPH KP 251, NYAGRAPH 249, NYAGRAPH 250, GRAFGUARD Grade 160-50N, GRAFGUARD Grade 160-80N, GRAFGUARD Grade 180-60N, GRAFGUARD Grade 200-100N, GRAFGUARD Grade 210-200N, GRAFGUARD Grade 220-50N, GRAFGUARD Grade 220-80N, GRAFGUARD Grade 250-50N, GRAFGUARD Grade 280-50N, or a combination thereof. In one embodiment, the graphite includes ASBURY Grade 3772, ASBURY Grade 1721, NYAGRAPH 351, or a combination thereof.

Embodiment 10 is the intumescent article of any one of embodiments 1 to 9, wherein the binder comprises a polymer or copolymer comprising a vinyl acetate acrylic, a vinyl acrylic, an acrylic, or a combination thereof, preferably a polymer or copolymer produced from the monomers: vinyl acetate, ethylene, and acrylate; from vinyl acetate and ethylene; or from ethylene and acrylate; or a combination thereof, most preferably a polymer or copolymer produced from the monomers vinyl acetate, ethylene, and acrylate. The binder may include polyvinyl acetate (PVA), vinyl acetate acrylics, vinyl acrylics, acrylics polymers, elastomers and copolymers, polychloroprene, polyurethane dispersions, polyvinyl alcohol (PVOH), vinyl acetate polymers (PVA) and copolymers (PVAC), ethylene vinyl acetate (EVA), natural rubber latex, and synthetic elastomers such as styrene-butadiene rubber (SBR) or polyurethane (PUR) and modified styrene-butadiene rubber (SBR), polyvinyl chloride (PVC), polymers and copolymers produced from the monomers vinyl acetate, ethylene, and acrylate; polymers and copolymers produced from the monomers vinyl acetate and ethylene; polymers and copolymers produced from the monomers ethylene and acrylate; or a combination thereof.

Embodiment 11 is the intumescent article of any one of embodiments 1 to 10, further comprising a skin adhered to the intumescent material by an adhesive. The skin may be a liner made of polymeric film, such as a polypropylene, polyethylene, PVC, or polystyrene film, or paper, metal foil, a non-woven matrix, a woven matrix, a foam, or the like, or any combination thereof. The skin may provide support to the intumescent material, allowing it to be more easily handled (e.g., cut and bent) without breakage. The skin may provide a surface for insignia, such as brand name and product information. The skin may include one or two layers of adhesive. Any suitable adhesive may be used, such as a pressure sensitive adhesive (PSA). Examples of suitable PSAs for use in the skin include adhesives made from natural rubbers, synthetic rubbers, styrene block copolymers, polyvinyl ethers, acrylics, poly-α-olefins, silicones, polyurethanes or polyureas, and combinations thereof.

Embodiment 12 is the intumescent article of embodiment 11, wherein the skin comprises a polymeric liner and an adhesive, and wherein the adhesive may be disposed between the intumescent material and the polymeric liner, on an outside surface of the polymeric liner, or both. In cases where an adhesive is disposed on the outside surface of the polymeric liner, the skin may further include a removable release liner.

Embodiment 13 is the intumescent article of any one of embodiments 1 to 12, wherein the intumescent material forms a layer having a thickness of 0.5 mm or greater, 1 mm or greater, 2 mm or greater, 3 mm or greater, or 4 mm or greater. The thickness of the intumescent material layer may be 6 mm or less, 8 mm or less, 10 mm or less, or 12 mm or less, although even greater thicknesses may be used. The thickness may range from 0.5 mm to 10 mm, from 1 mm to 8 mm, or from 2 mm to 6 mm.

Embodiment 14 is the intumescent article of any one of embodiments 1 to 13, wherein the intumescent material consists of graphite and binder.

Embodiment 15 is the intumescent article of any one of embodiments 1 to 14, wherein the intumescent article is free of flame retardant agents, such as aluminum hydroxide (ATH); magnesium hydroxide (MDH); huntite; hydromagnesite; red phosphorus; boron compounds such as borates; organohalogen compounds; acid derivative and chlorinated paraffins; organobromines such as decabromodiphenyl ether (decaBDE) and decabromodiphenyl ethane; polymeric brominated compounds such as brominated polystyrenes; brominated carbonate oligomers (BCOs); brominated epoxy oligomers (BEOs); tetrabromophthalic anyhydride; tetrabromobisphenol; tetrabromobisphenol A (TBBPA); hexabromocyclododecane (HBCD); melamine phosphate; and melamine polyphosphate.

Embodiment 16 is an intumescent article for an electrical box having a back wall with a surface area surrounded by side walls defining a volume, the intumescent article comprising: an intumescent sheet having a shape defining a surface area and comprising intumescent material, the intumescent material comprising: from 50 wt-% to 92 wt-% graphite; and from 8 wt-% to 50 wt-% binder, the surface area of the intumescent sheet being smaller than the surface area of the electrical box back wall.

Embodiment 17 is the intumescent article of embodiment 16, wherein the intumescent sheet has a mass, and wherein a ratio of the mass to the volume of the electrical box is 3 g/100 $cm^3$ or less, 2.5 g/100 $cm^3$ or less, 2.0 g/100 $cm^3$ or less, 1.5 g/100 $cm^3$ or less, or 1.2 g/100 $cm^3$ or less.

Embodiment 18 is the intumescent article of embodiment 16 or 17, wherein the surface area of the intumescent sheet is 75% or less, 60% or less, 50% or less, 40% or less, 30% or less, or 25% or less of the surface area of the electrical box back wall.

Embodiment 19 is the intumescent article of any one of embodiments 16 to 18, wherein the surface area of the intumescent sheet is 80 $cm^2$ or less, 60 $cm^2$ or less, 50 $cm^2$ or less, 40 $cm^2$ or less, 30 $cm^2$ or less, 25 $cm^2$ or less, 20 $cm^2$ or less, or 15 $cm^2$ or less.

Embodiment 20 is the intumescent article of any one of embodiments 16 to 19, wherein the intumescent article has a mass of 12 g or less, 10 g or less, 8 g or less, or 6 g or less.

Embodiment 21 is the intumescent article of any one of embodiments 16 to 20, wherein the intumescent material forms a layer having a thickness of 0.5 mm or greater, 1 mm or greater, 2 mm or greater, 3 mm or greater, or 4 mm or greater. The thickness of the intumescent material layer may be 6 mm or less, 8 mm or less, 10 mm or less, or 12 mm or less, although even greater thicknesses may be used. The thickness may range from 0.5 mm to 10 mm, from 1 mm to 8 mm, or from 2 mm to 6 mm.

Embodiment 22 is the intumescent article of any one of embodiments 16 to 21, wherein upon heating to 350° C. or greater, the intumescent material is capable of expanding to fill 90% or more, 95% or more, 98% or more, or 100% of the volume of the electrical box.

Embodiment 23 is the intumescent article of any one of embodiments 16 to 22, wherein the intumescent sheet is shaped as a square, a triangle, a circle, or an L-shape.

Embodiment 24 is a method of applying an intumescent sheet to an enclosure having a back wall surrounded by side walls, the method comprising: applying the intumescent sheet onto at least one of the walls of the enclosure, covering less than 75% of a surface area of the back wall with the intumescent sheet, the intumescent sheet comprising a layer of intumescent material comprising: from 50 wt-% to 92 wt-% graphite; and from 8 wt-% to 50 wt-% binder.

Embodiment 25 is the method of embodiment 24, wherein the enclosure is disposed within a fire wall.

Embodiment 26 is the method of embodiment 24 or 25, wherein the enclosure comprises an electrical box, a fire extinguisher box, or an elevator call box.

Embodiment 27 is the method of any one of embodiments 24 to 26, wherein the intumescent sheet has a surface area 60% or less, 50% or less, 40% or less, 30% or less, or 25% or less of the surface area of the enclosure back wall.

Embodiment 28 is the method of any one of embodiments 24 to 27 wherein the covering comprises applying a plurality of discontinuous intumescent sheets onto at least one of the walls, the plurality of intumescent sheets having a total surface area that is 75% or less, 60% or less, 50% or less, 40% or less, 30% or less, 25% or less, or 20% or less of the surface area of the back wall.

Embodiment 29 is the method of any one of embodiments 24 to 28, wherein the intumescent sheet is applied to the back wall, to a side wall, or to both the back wall and the side wall.

Embodiment 30 is the method of any one of embodiments 24 to 29, wherein the intumescent sheet has a mass and the enclosure has an interior volume, and wherein a ratio of the mass to the interior volume is 3 g/100 $cm^3$ or less, 2.5 g/100 $cm^3$ or less, 2.0 g/100 $cm^3$ or less, 1.5 g/100 $cm^3$ or less, or 1.2 g/100 $cm^3$ or less.

Embodiment 31 is the method of any one of embodiments 24 to 30, wherein upon heating to 350° C. or greater, the intumescent material is capable of expanding to fill 90% or more, 95% or more, 98% or more, or 100% of an interior volume of the enclosure.

Embodiment 32 is the method of any one of embodiments 24 to 31, wherein the enclosure is an electrical box, and wherein the method comprises leaving holes of the electrical box for electrical conduits and screws exposed. Applying the intumescent sheet comprises not covering at least some of the holes of the electrical box.

Embodiment 33 is a method of making an intumescent article, the method comprising: mixing from 50 wt-% to 92 wt-% graphite with 8 wt-% to 50 wt-% binder on a dry weight basis to form a mixture; pressing or molding the mixture into a shape; and drying the shape.

Embodiment 34 is the method of embodiment 33, wherein the mixture further comprises a solvent.

Embodiment 35 is the method of embodiment 34, wherein the solvent is water.

Embodiment 36 is the method of any one of embodiments 33 to 35, wherein mixing the graphite with the binder comprises forming an emulsion or dispersion.

Embodiment 37 is the method of embodiment 33, wherein the mixture has a solids content of 40 wt-% to 80 wt-%, from 50 wt-% to 70 wt-%, or from 55 wt-% to 65 wt-%.

Embodiment 38 is the method of any one of embodiments 33 to 37, further comprising adhering a skin to the dried shape. The skin may be a liner made of polymeric film, such as a polypropylene, polyethylene, PVC, or polystyrene film, or paper, metal foil, a non-woven matrix, a woven matrix, a foam, or the like, or any combination thereof.

Embodiment 39 is the method of any one of embodiments 33 to 38, wherein the shape is a sheet.

Embodiment 40 is the method of any one of embodiments 33 to 38, wherein the shape is three-dimensional comprising a major surface extending in three dimensions. The shape may be a concave shape (e.g., a cup), a tube, or a shape that includes both flat and curved portions.

EXAMPLES

The following examples are for illustrative purposes only and are not meant to be limiting on the scope of the appended claims. All parts, percentages, ratios, etc. in the examples and the rest of the specification are by weight, unless noted otherwise. The following abbreviations are used here: mm=millimeter; $mm^3$=cubic millimeter; cm=centimeter; $cm^2$=square centimeter; $cm^3$=cubic centimeter.

Example 1

Sample Preparation Procedure

Samples A-L and comparative samples C7-C9 were prepared by using the following procedure.

A 100 g batch was prepared by measuring expandable graphite and binder in a 500.0 mL plastic tripod according to the compositions listed in TABLE 1. The materials were then mixed with a wooden spatula at room temperature (about 21° C.). After thorough mixing, the mixture was placed into an aluminum mold and pressed into a sheet in a CARVER press at 5000 psi and room temperature. The pressed sheet was dried at 120° C. for 2 hours in a ventilated oven. Afterwards, sheathing tape (3M™ VENTURE TAPE™ 1585 CW) was applied on both sides of the dried sheet.

TABLE 1

Compositions of Samples.

| Sample ID | Component | Amount (wt-%) | Component | Amount (wt-%) |
|---|---|---|---|---|
| A | ASBURY Grade 3772 | 80 | VINNAPAS ® EAF 68 | 20 |
| B | NYACOL ® NYAGRAPH ® 351 | 80 | VINNAPAS ® EAF 68 | 20 |
| C | ASBURY Grade 3772 | 90 | VINNAPAS ® EAF 68 | 10 |
| D | ASBURY Grade 3772 | 70 | VINNAPAS ® EAF 68 | 30 |
| E | ASBURY Grade 3772 | 60 | VINNAPAS ® EAF 68 | 40 |
| F | NYACOL ® NYAGRAPH ® KP 251 | 80 | VINNAPAS ® EAF 68 | 20 |
| G | NYACOL ® NYAGRAPH ® 251 | 80 | VINNAPAS ® EAF 68 | 20 |
| H | ASBURY Grade 3772 | 80 | ACRONAL ® 3633 | 20 |
| I | ASBURY Grade 3772 | 80 | Neoprene 671A | 20 |
| J | ASBURY Grade 3772 | 80 | RHOPLEX ™ HA 8 | 20 |
| K | GRAFGUARD ® 180-60N | 70 | VINNAPAS ® 323 | 30 |
| L | GRAFGUARD ® 160-50N | 80 | VINNAPAS ® EF575 | 20 |
| C1 | HILTI ® Firestop Box Inserts 4 × 4 | Commercially available product, see TABLE 2A. | | |
| C2 | STI ® EP Powershield Electrical Box Insert, EP44 | Commercially available product, see TABLE 2A. | | |
| C3 | 3M ™ UltraGS graphite wrap | Commercially available product, see TABLE 2A. | | |
| C4 | STI ® blue | Commercially available product, see TABLE 2A. | | |
| C5 | STI ® red | Commercially available product, see TABLE 2A. | | |
| C6 | METACAULK ® Box Guard, Rectorseal | Commercially available product, see TABLE 2A. | | |
| C7 | ASBURY Grade 3772 | 50 | VINNAPAS ® EAF 68 | 50 |
| C8 | GRAFGUARD ® 220-80N | 80 | VINNAPAS ® EAF 68 | 20 |
| C9 | ASBURY Grade 3772 | 80 | ALBERDINGK ® U 4101 | 20 |

The following materials (TABLE 2A) and equipment (TABLE 2B) were used to prepare the samples.

TABLE 2A

List of Materials used.

| Material | Material type | Source |
|---|---|---|
| NYACOL ® NYAGRAPH ® 351 | Expandable graphite | Nyacol Nano Technologies, Inc. in Ashland, MA, USA |
| ASBURY Grade 3772 | Expandable graphite | Asbury Graphite Mills Inc. In Asbury, NJ, USA |
| GRAFGUARD ® 250-50N | Expandable graphite | NeoGraf Solutions in Lakewood, OH, USA |
| NYACOL ® NYAGRAPH ® KP 251 | Expandable graphite | Nyacol Nano Technologies, Inc. |
| NYACOL ® NYAGRAPH ® 251 | Expandable graphite | Nyacol Nano Technologies, Inc. |
| GRAFGUARD ® 160-50N | Expandable graphite | NeoGraf Solutions |
| GRAFGUARD ® 220-80N | Expandable graphite | NeoGraf Solutions |
| GRAFGUARD ® 180-60N | Expandable graphite | NeoGraf Solutions |
| VINNAPAS ® EAF-68 | Binder | Wacker Chemie AG in Munich, Germany |
| ACRONAL ® 3633 | Binder | BASF in Ludwigshafen, Germany |
| ALBERDINGK ® U 4101 | Binder | ALBERDINGK ® Boley, Inc. in Greensboro, NC |
| Neoprene 671A Liquid Dispersion | Binder | Denka Performance Elastomer LLC in LaPlace, LA, USA |
| RHOPLEX ™ HA 8 | Binder | The Dow Chemical Company in Collegeville, PA, USA |
| VINNAPAS ® 323 | Binder | Wacker Chemie AG |
| VINNAPAS ® EF575 | Binder | Wacker Chemie AG |
| 3M ™ VENTURE TAPE ™ 1585 CW | Cover film | 3M Company in Saint Paul, MN, USA |
| STI ® Red | Comparative material | Specified Technologies Inc. in Somerville, NJ USA |
| STI ® Blue | Comparative material | Specified Technologies Inc. |
| Firestop box insert HILTI ® | Comparative material | HILTI Inc. in New Castle, PA, USA |
| STI ® EP Powershield Electrical Box Insert, EP44 | Comparative material | Specified Technologies Inc. |
| 3M ™ UltraGS graphite wrap | Comparative material | 3M Company |
| METACAULK ® Box Guard | Comparative material | Rectorseal in Houston, TX, USA |

TABLE 2B

Equipment used.

| Equipment | Application | Source |
|---|---|---|
| CARVER Press | Press | Carver, Inc. in Wabash, IN, USA |
| Oven | Drying | Thermo Fisher Scientific in Waltham, MA, USA |
| Muffle furnace | Sample Burning | MTI Corp in Richmond, CA, USA |

Test Methods

Free Expansion Test Procedure

The samples were cut into a round shape (unless otherwise indicated) using a metal mold. The initial diameter ($D_i$) and height ($h_i$) of each sample before expansion testing was recorded to calculate initial volume of the sample ($V_i$) using Equation 1. Each round piece was placed into an aluminum tray and then burned in a muffle furnace at 350° C. for fifteen minutes. After 15 minutes, expanded samples were cooled to room temperature, and the diameter ($D_f$) and height of the expanded sample ($h_f$) were recorded. The volume of the expanded sample ($V_f$) was calculated using Equation 2.

$$V_i = \pi r_i^2 h_i \quad \text{Equation (1)}$$

Where $V_i$=initial volume of the sample, $r_i$=initial radius of the sample and $h_i$=initial height of the sample $$V_f = \pi r_f^2 h_f \quad \text{Equation (2)}$$

Where $V_f$=volume of the expanded sample, $r_f$=radius of the expanded sample and $h_f$=height of the expanded sample Constrained Expansion Test Procedure The samples were cut into a round shape (unless otherwise indicated) using a metal mold. The initial diameters ($D_i$) and heights ($h_i$) of the samples before expansion testing were recorded to calculate initial volume of samples ($V_i$) using Equation 1. Each round piece was cut into four pieces and all pieces of a sample were placed into a graduated quartz cylinder to constrain expansion laterally. The samples were burned in a muffle furnace at 350° C. for fifteen minutes. After 15 minutes expanded samples were cooled to room temperature, and the volume of the expanded sample ($V_f$) was recorded from the quartz cylinder.

Expansion Ratio

Expansion ratio of a sample is determined from the ratio of initial volume ($V_i$) and expanded volume ($V_f$) of the sample according to Equation 3

$$\text{Expansion ratio} = V_f/V_i \qquad \text{Equation (3)}$$

Expansion Aspect Ratio

Aspect ratio of a sample is determined from the ratio of diameter ($D_f$) and height of the expanded sample ($h_f$) according to Equation 4

$$\text{Aspect ratio} = h_f/D_f \qquad \text{Equation (4)}$$

Testing and Results

Free expansion testing of all samples and comparative samples listed in TABLE 1 was performed by using the Free Expansion Test Procedure. The free expansion ratio and free expansion aspect ratio were calculated from the test results according to Equations (3) and (4). The results are shown in TABLE 3. Constrained expansion testing of samples A and B and comparative samples C1-C6 was performed by using the Constrained Expansion Test Procedure. The constrained expansion ratio was calculated from the test results according to Equation (3). The results are shown in TABLE 4.

TABLE 3

Free Expansion Test Results at 350° C. for 15 min

| | Initial Sample | | | Expanded Sample | | | | |
|---|---|---|---|---|---|---|---|---|
| Sample | Diameter, $D_i$ (mm) | Height, $h_i$ (mm) | Initial volume, $V_i$ ($mm^3$) | Diameter, $D_f$ (mm) | Height, $h_f$ (mm) | Volume, $V_f$ ($mm^3$) | Expansion Ratio, ($V_f/V_i$) | Aspect Ratio, ($h_f/D_f$) |
| A | 12.7 | 3.2 | 410 | 50.2 | 36.6 | 72,000 | 179 | 0.7 |
| B | 12.6 | 3.0 | 370 | 59.3 | 39.2 | 108,000 | 289 | 0.7 |
| C | 24.0 | 3.1 | 1500 | 98.8 | 45.1 | 346,000 | 230 | 0.5 |
| D | 24.0 | 3.1 | 1400 | 81.0 | 38.3 | 200,000 | 140 | 0.5 |
| E | 24.0 | 2.9 | 1300 | 72.6 | 38.8 | 160,000 | 122 | 0.5 |
| F | 24.0 | 3.4 | 1500 | 95.2 | 39.6 | 280,000 | 182 | 0.4 |
| G | 24.2 | 3.2 | 1500 | 90.2 | 49.6 | 320,000 | 213 | 0.6 |
| H | 23.8 | 3.2 | 1400 | 91.3 | 49.8 | 340,000 | 228 | 0.5 |
| I | 24.1 | 3.5 | 1600 | 91.9 | 45.8 | 300,000 | 190 | 0.5 |
| J | 23.9 | 3.1 | 1400 | 90.9 | 42.2 | 270,000 | 194 | 0.5 |
| K | 13.4 | 3.5 | 160 | 56.0 | 35.0 | 27,000 | 175 | 0.6 |
| L | 13.4 | 4.0 | 180 | 58.0 | 29.0 | 24,000 | 136 | 0.5 |
| C1 | 12.5 | 6.0 | 740 | 24.9 | 67.0 | 33,000 | 44 | 2.7 |
| C2 | 12.5 | 3.4 | 420 | 40.0 | 37.0 | 46,000 | 111 | 0.9 |
| C3 | 12.6 | 3.2 | 400 | 14.4 | 67.3 | 11,000 | 28 | 4.7 |
| C4 | 12.6 | 4.0 | 500 | 29.4 | 82.0 | 56,000 | 112 | 2.8 |
| C5 | 12.1 | 6.3 | 720 | 29.2 | 39.9 | 27,000 | 37 | 1.4 |
| C6 | 12.2 | 5.2 | 610 | 35.0 | 34.2 | 33,000 | 54 | 1.0 |
| C7 | 24.0 | 3.9 | 1800 | 69.2 | 35.2 | 130,000 | 73 | 0.5 |
| C8 | 23.8 | 3.3 | 1500 | 72.7 | 34.2 | 140,000 | 95 | 0.5 |
| C9 | 23.8 | 3.2 | 1400 | Powder | Powder | Powder | Powder | Powder |

Comparative sample C9 formed a free-flowing powder upon heating, and the dimensions could not be measured.

TABLE 4

Constrained Expansion Test Results at 350° C. for 15 min

| | Initial Sample | | | Expanded Sample | |
|---|---|---|---|---|---|
| Sample | Diameter, $D_i$ (mm) | Height, $h_i$ (mm) | Initial volume, $V_i$ ($mm^3$) | Volume $V_f$, ($mm^3$) | Expansion Ratio ($V_f/V_i$) |
| A | 9.6 | 3.3 | 237 | 31000 | 131 |
| B | 9.5 | 3.0 | 214 | 29000 | 136 |
| C1 | 9.4 | 6.0 | 419 | 27000 | 64 |
| C2 | 9.3 | 3.3 | 223 | 17000 | 76 |
| C3 | 9.5 | 3.2 | 227 | 20000 | 88 |
| C4 | 9.5 | 4.0 | 283 | 24000 | 85 |
| C5 | 8.8 | 6.4 | 387 | 18000 | 47 |
| C6 | 9.0 | 5.1 | 323 | 15000 | 46 |

Example 2

The expansion capability of various sizes and shapes of Sample A and Comparative Samples C1 and C2 was tested. The samples were prepared as in Example 1. The samples were cut either into a square or a circle, sized as indicated in TABLE 5. Each sample was placed into a 4 inch×4 inch×2⅛ inch (about 10 cm×10 cm×5.4 cm) metal electrical box. In the case of round samples, four rounds were placed into the electrical box. The samples were tested according to the Free Expansion Test Procedure described above. The area relative to back wall was calculated as the area of the sample divided by area of back wall of the box (16 $inch^2$, about 103 $cm^2$). Fill volume was calculated by measuring the percentage of the box filled with expanded graphite at the end of the test.

Results

The results of the testing are shown in TABLE 5 below.

TABLE 5

Free Expansion Test Results at 350° C. for 15 min

| | Sample ID | Mass (g) | Dimensions (inches) | Dimensions (cm) | Area ($inch^2$) | Area ($cm^2$) | Area relative to back wall (%) | Mass to volume (g/100 $cm^3$) | Fill volume (%) |
|---|---|---|---|---|---|---|---|---|---|
| Center | B | 6.2 g | 1.5 × 1.5 | 3.8 × 3.8 | 2.25 | 14.5 | 14% | 1.1 | 100% |
| | C2 | 5.6 g | 1.5 × 1.5 | 3.8 × 3.8 | 2.25 | 14.5 | 14% | 1.0 | 40% |
| | C1 | 5.8 g | 1 × 1.13 | 2.5 × 2.9 | 1.13 | 7.3 | 7% | 1.0 | 40% |
| | C1 | 10.9 g | 1.5 × 1.5 | 3.8 × 3.8 | 2.25 | 14.5 | 14% | 1.8 | 70% |
| Corner | B | 5.9 g | 1.5 × 1.5 | 3.8 × 3.8 | 2.25 | 14.5 | 14% | 1.1 | 100% |
| | C2 | 6.0 g | 1.5 × 1.5 | 3.8 × 3.8 | 2.25 | 14.5 | 14% | 1.1 | 50% |
| | C1 | 10.9 g | 1.5 × 1.5 | 3.8 × 3.8 | 2.25 | 14.5 | 14% | 1.8 | 70% |
| Multi | B | 8.3 g | 4 rounds, 1 inch | 4 rounds, 2.5 cm | 3.14 | 20.3 | 20% | 1.5 | 100% |
| | C2 | 8.3 g | 4 rounds, 1 inch | 4 rounds, 2.5 cm | 3.14 | 20.3 | 20% | 1.5 | 50% |
| | C1 | 15.6 g | 4 rounds, 1 inch | 4 rounds, 2.5 cm | 3.14 | 20.3 | 20% | 2.7 | 80% |
| Side | B | 8.4 g | 1.75 × 1.75 | 4.4 × 4.4 | 3.06 | 19.7 | 19% | 1.5 | 100% |
| | C2 | 9.0 g | 1.5 × 2.3 | 3.8 × 5.8 | 2.88 | 18.6 | 18% | 1.6 | 40% |
| | C1 | 9.4 g | 1.25 × 1.5 | 3.2 × 3.8 | 1.88 | 12.1 | 18% | 1.7 | 40% |

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

What is claimed is:

1. An intumescent article comprising intumescent material, the intumescent material comprising:

from 50 wt-% to 92 wt-% intercalated graphite;

from 8 wt-% to 50 wt-% binder; and wherein the intumescent material has a free expansion ratio of at least 100× at 350° C. for fifteen minutes, has a free expansion aspect ratio of 0.8 or less upon heating to 350° C. for fifteen minutes, and has a constrained expansion ratio of 90× or greater upon heating to 350° C. for fifteen minutes when constrained in two lateral dimensions while being free to expand in thickness (e.g. height).

2. The intumescent article of claim 1, wherein the intumescent material forms a self-supporting layer having a density of 0.1 g/$cm^3$ to 0.5 g/$cm^3$, wherein the intumescent material consists essentially of the intercalated graphite and the binder.

3. The intumescent article of claim 1, wherein the article comprises a major surface extending in three dimensions.

4. The intumescent article of claim 1, wherein the intumescent material comprises from 55 wt-% to 90 wt-% graphite or wherein the intumescent material comprises from 10 wt-% to 45 wt binder.

5. The intumescent article of claim 1, the binder is substantially free of (or excludes) rubbers, styrene-based block copolymers, and butyl adhesives, and wherein the binder comprises a polymer or copolymer produced from vinyl acetate, ethylene and acrylate.

6. The intumescent article of claim 1, wherein the intumescent material has a free expansion ratio of 110× or greater.

7. The intumescent article of claim 1, wherein the binder comprises a polymer or copolymer comprising a vinyl acetate acrylic, a vinyl acrylic, an acrylic, or a combination thereof.

8. The intumescent article of claim 1, further comprising a skin adhered to the intumescent material by an adhesive.

9. The intumescent article of claim 8, wherein the skin comprises a polymeric liner and an adhesive, and wherein the adhesive may be disposed between the intumescent material and the polymeric liner, on an outside surface of the polymeric liner, or both.

10. The intumescent article of claim 1, wherein the intumescent material forms a layer having a thickness of 0.5 mm to 10 mm.

11. The intumescent article of claim 1, wherein the intumescent material consists essentially of graphite and binder.

12. The intumescent article of claim 1, wherein the intumescent article is free of flame retardant agents.

* * * * *